United States Patent [19]

Cahen

[11] Patent Number: 5,423,053

[45] Date of Patent: Jun. 6, 1995

[54] DEVICE MANAGING ACCESSING PRIORITY TO COMMON RESOURCES, OF FUNCTIONAL MODULES DIVIDED OVER A PLURALITY OF LOCAL UNITS IN EACH OF WHICH THEY FORM OF LOCAL DAISY CHAIN

[75] Inventor: François Cahen, Le Plessis Robinson, France

[73] Assignee: Sextant Avionique, Meudon la Foret Cedex, France

[21] Appl. No.: 63,702

[22] Filed: May 20, 1993

[30] Foreign Application Priority Data

May 21, 1992 [FR] France ............................. 92 06179

[51] Int. Cl.6 .............................................. G06F 13/00
[52] U.S. Cl. ................................ 395/800; 364/229.5; 364/242.6; 364/242.9; 364/DIG. 1
[58] Field of Search ......................... 395/800, 725, 325

[56] References Cited

U.S. PATENT DOCUMENTS

| 4,159,470 | 6/1979 | Strojny | 371/8.2 |
|---|---|---|---|
| 4,374,413 | 2/1983 | Comfort et al. | 395/725 |
| 4,510,599 | 4/1985 | Ulug | 370/85 |
| 4,674,085 | 6/1987 | Aranguren | 370/85.2 |
| 4,761,762 | 8/1988 | Holmes | 395/725 |
| 4,914,574 | 4/1990 | Terada | 395/325 |

FOREIGN PATENT DOCUMENTS 0265574 10/1986 European Pat. Off. .
WO8404185 10/1984 WIPO .

Primary Examiner—Eric Coleman
Attorney, Agent, or Firm—Browdy and Neimark

[57] ABSTRACT

The device embodying the invention comprises a plurality of functional modules divided over a plurality of local units in each of which they form a local daisy chain, said local units being interconnected so as to form an external daisy chain, and each comprising a coupling module enabling propagation of a local daisy chain towards the external daisy chain and vice versa. The invention relates notably to the interconnection of plural trays each containing a limited number of instrumentation modules or boards.

5 Claims, 3 Drawing Sheets

DEVICE MANAGING ACCESSING PRIORITY TO COMMON RESOURCES, OF FUNCTIONAL MODULES DIVIDED OVER A PLURALITY OF LOCAL UNITS IN EACH OF WHICH THEY FORM OF LOCAL DAISY CHAIN

BACKGROUND OF THE INVENTION

1. Field of the Invention

This invention relates to device managing accessing priority to common resources, of functional modules divided over a plurality of local units in each of which they form a local daisy chain.

It applies notably, though not exclusively, to the interconnection of plural trays each containing a limited number of instrumentation modules or boards.

The modules of each tray are interconnected according to the daisy chain principle, thereby enabling management of the priority of the modules in the tray as regards access to the locally available resources.

When the number of modules to be implemented exceeds the capacity of one single tray, plural interconnected trays must then be used.

2. Description of the Prior Art

A first solution consists in interconnecting the daisy chains of all the trays so as to form a single daisy chain.

If the implementation of the daisy chain requires that communications be set up between the modules, this solution has the drawback of mobilizing the communication channels of all the trays.

Another solution consists in using an arbitration device which successively interrogates all the trays, thus activating the daisy chain of each tray to determine the requesting tray. This solution has the drawback of being more time consuming due to the fact that the search for the requesting module with the highest priority requires several interrogations.

OBJECT OF THE INVENTION

The object of this invention is to remedy the preceding disadvantages.

The invention provides, in a general manner, a device managing the accessing priority to common resources of functional modules divided over a plurality of local units forming, in each of said units, a local daisy chain in which each functional module comprises a switch connected serially to the switches of the previous and/or next modules in the chain, this switch having at least two statuses:

- a closed status in which it closes the chain when there is no request from the module in which it is situated, and
- an open status in which it interrupts the chain when, subsequent to a request, the module is awaiting a reply transmitted by the first module in the chain which receives the requests and acts as arbiter.

SUMMARY OF THE INVENTION

Accordingly, the invention provides a device wherein:
- the local units are interconnected so as to form an external daisy chain operating according to a principle similar to that of the local daisy chain,
- each local unit comprises a coupler having as function:
  - either to ensure the continuity of the external daisy chain when none of the modules in the local unit has made a request,
  - or to interrupt the external daisy chain and connect it to the local daisy chain when a module in the local unit so requests, and reciprocally, when a module in the local unit has requested a resource available in another local unit.

BRIEF DESCRIPTION OF THE DRAWINGS

Other features and advantages of the invention will be clear from an embodiment described hereafter, by way of a non limiting example, with reference to the accompanying drawings in which.

DESCRIPTION OF THE PREFERRED EMBODIMENTS

Figure 1:
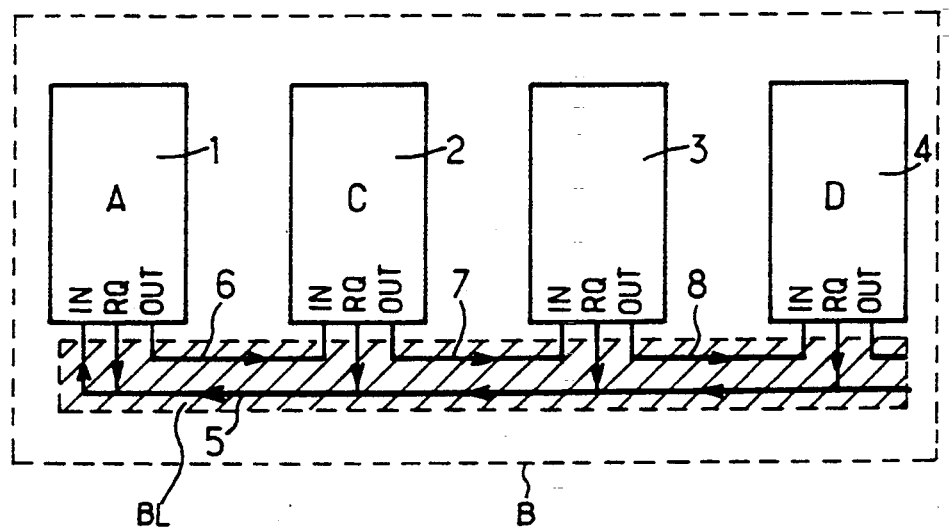
FIG. 1 is a schematic representation of a daisy chain formed by a set of modules installed in a same tray B.

A tray B, such as represented in FIG. 1, contains plural modules (1, 2, 3, 4) interconnected in a daisy chain by the local bus BL (shown in broken lines).

Each module comprises at least three IN, RQ and OUT terminals for connection with the other modules.

The local bus BL is comprised of at least two lines.

The first line 5 connects the RQ terminals of each module to the IN terminal of module A which is situated at the start of the chain and acts as arbiter. This line serves to transmit the requests from modules 2, 3 and 4 to the arbiter A.

The second line comprised of the elements 6, 7, 8 connects the OUT terminal of each module to the IN terminal of the next module, thus forming the chain. This line serves to transmit the authorizations from the arbitrating module A to the other modules in the chain.

Figure 2:
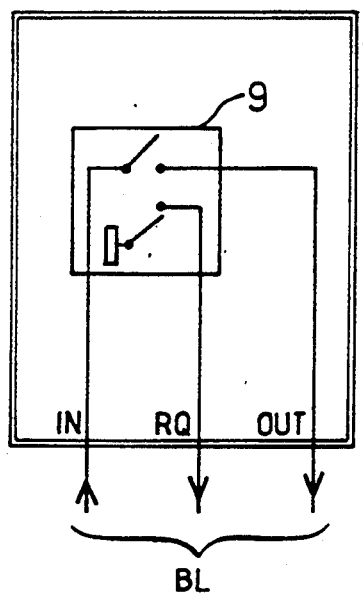
FIG. 2 is the skeleton diagram of the switching device enabling each module to act upon the daisy chain.

Each module is fitted with a switching device, as represented in FIG. 2, comprised of a double switch 9 with at least two statuses:
- a closed status in which the IN terminal is connected to the OUT terminal and the RQ terminal is open, thereby indicating to the arbitrating module A that the module has not submitted any request, and
- an open status in which the IN terminal is not connected to the OUT terminal and a signal is sent to the RQ terminal, thereby indicating to the arbitrating module A that the module is making a request.

The operation of the daisy chain can be described as follows:
  when a module makes a request by sending a signal to its RQ terminal, its switching device 9 takes on the open status. The arbitrating module A receives this request and, if it decides to grant the request, sends a signal to its OUT terminal. This signal is then received and retransmitted by each module in the chain up to the first module which opened the chain and thus made a request.

In this way, the module with the highest priority, i.e. the module served first, corresponds to the requestor situated nearest arbitrating module A.

Figure 4:
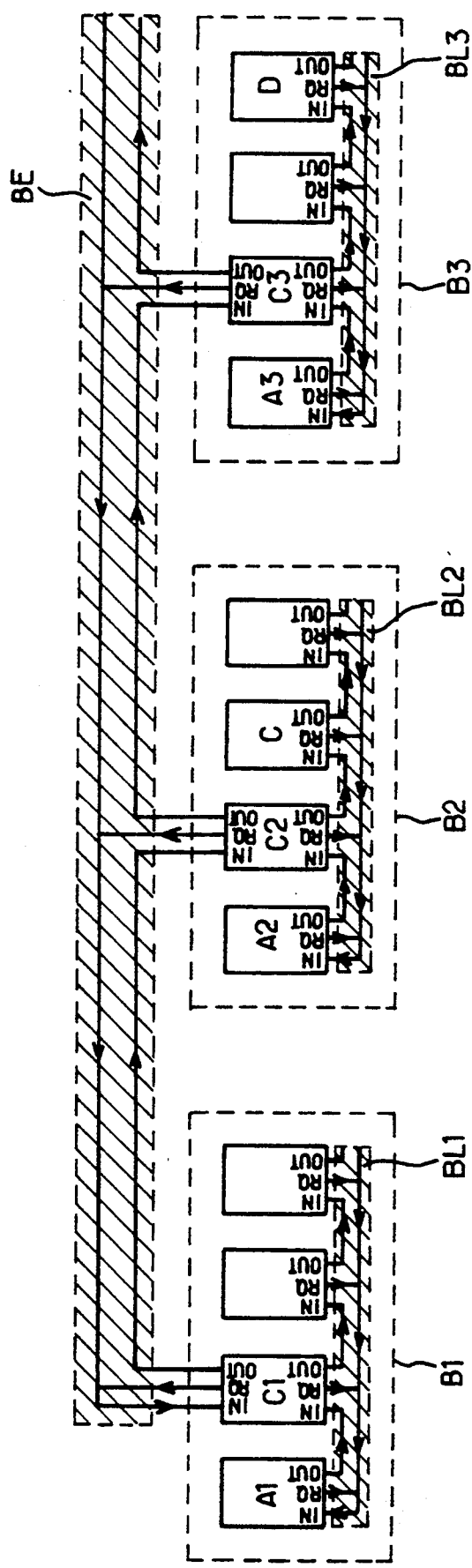
FIG. 4 is the skeleton diagram of the daisy chain interconnection of plural trays by means of coupling device corresponding to the invention.

FIG. 4 represents three trays B1, B2, B3 similar to tray B represented in FIG. 1 and interconnected so as to form a daisy chain similar to the one represented by FIG. 1.

For this purpose, each tray must have a coupling device C1, C2, C3 which enables the local buses BL1, BL2, BL3 of each tray to be connected to the external bus BE (shown in broken lines) to ensure continuity between the local daisy chains and the external daisy chain when necessary.

According to the diagram represented by FIG. 4, each coupling device behaves in relation to the external bus BE in a similar manner to a module in relation to its local bus.

As the coupler C1 is situated at the start of the chain in relation to the external bus BE, it will also act as arbiter for the bus BE.

Figure 3:
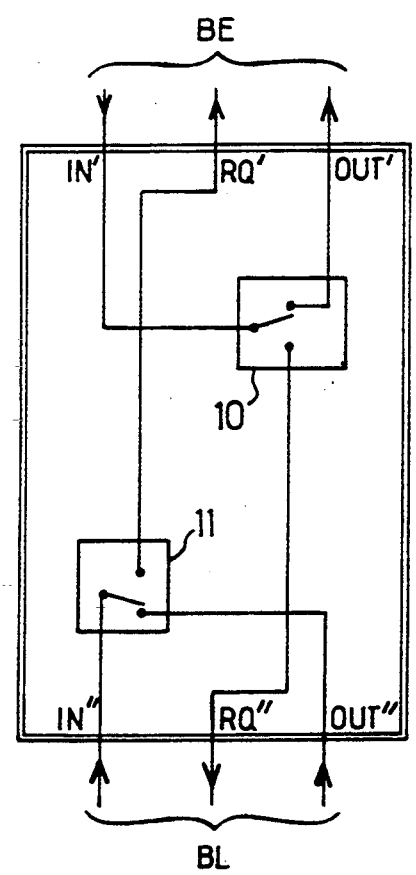
FIG. 3 is the skeleton diagram of the coupling device enabling plural trays to be interconnected.

The coupling device as represented by FIG. 3 is comprised of two switches 10 and 11.

The switch 10 enables the IN' terminal connected to the external bus BE to be connected:
  either to the OUT' terminal connected to the same bus when the tray is not the destination,
  or to the RQ'' terminal connected to the local bus BL of the tray when it is the destination.

The switch 11 enables the IN'' terminal connected to the local bus BL to be connected:
  either to the OUT'' terminal connected to the same bus in order to ensure the continuity of the daisy chain activated on the local bus BL,
  or to the RQ' terminal connected to the external bus BE when a module of the tray containing the coupler has submitted a request destined for a module situated in another tray.

Figure 5:
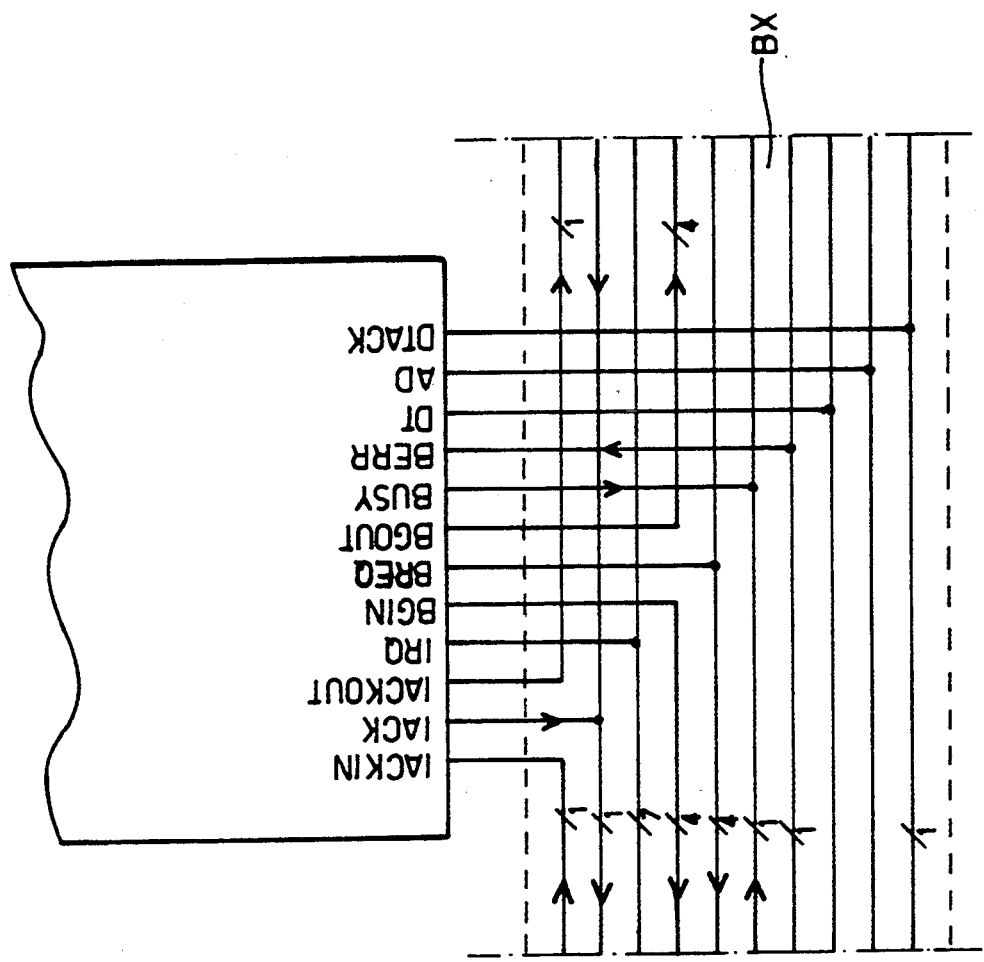
FIG. 5 schematically represents an example of a bus of a structure corresponding substantially to the VME bus and connection thereof with a module or coupling device.

The bus BX represented by FIG. 5 enables five daisy chains to be constituted:
  a first daisy chain by means of the IACKIN, IACK and IACKOUT terminals which can be assigned to the transmission of interruption acknowledgements, and
  four other daisy chains by means of the BGIN, BREQ and BGOUT terminals, each of these terminals being constituted by four wires that can be assigned to the transfer of the BREQ requests and BGIN, BGOUT access grants to the bus BX.

It also groups together the seven interruption request IRQ lines, the BUSY line enabling the fact that the bus is busy to be indicated, the BERR line indicating that an error has been detected on the bus, the DTACK line enabling validation of a data transfer, and the lines used for data transfers DT and address transfers AD.

The principle set forth by the invention is particularly useful for the acknowledgement of interruptions in a system comprised of trays represented by FIG. 4, interconnected by an external bus BE of the type represented by FIG. 5, and each containing a set of modules interconnected by a local bus of the same type.

In such a system, when a module D requests an interruption, two cases can arise:
  either the module C controlling the requested interruption is situated in the same tray as the requesting module D, such as represented by FIG. 1,
  or the controlling module C is in a different tray to that of the requesting module D, such as represented by FIG. 4.

The interruption acknowledging process is carried out as follows:
  in both cases, the module C controlling the activated interruption requests access to the local bus BL by emitting a signal on one of the four BREQ lines of the bus BL.

This signal arrives directly at the arbitrating module A situated at the start of the chain in the tray.

When the arbitrating module A decides to grant access to the bus, it sends a signal to the BGOUT terminal corresponding to the BREQ line used for the request.

This signal is received at the corresponding BGIN terminal and is retransmitted via the BGOUT terminal by each module in the tray up to the first module requesting the bus BL, according to the order in which they appear in the chain.

When the module C controlling the interruption receives the bus access grant, it declares it busy by emitting a signal on the BUSY line of the bus and writes the interruption number (from 1 to 7) on the address transfer AD lines of the bus.

At the same time, it activates the IACK interruption acknowledgement signal which arrives directly at the arbitrating module A on the IACKIN terminal.

The arbiter A activates the daisy chain associated with the IACK signal by sending a signal to its IACKOUT terminal, connected to the local bus BL, to the next module in the chain.

The IACK signal transmission process is similar to the process used to transmit the bus access grant.

In the first case, i.e. when the interruption requestor is in the same tray, the IACKIN signal is finally received by the interruption requestor D, of which the number figures in the address lines AD of the bus, situated closest to the arbiter A in the chain.

The module D requesting the interruption then presents the interruption vector on the data transfer lines of the bus BL which it validates by the signal DTACK, thereby enabling the controller C to declare the bus free by emitting the corresponding signal on the BUSY line of the bus BL.

This process corresponds to the process described by the VME standard.

In the second case, when the module C controlling the interruption is not in the same tray as the requesting module D that activated the interruption, the IACKIN signal is received by the coupling module C2 of tray B2 which contains the controlling module C which then adopts the same behavior in relation to the external bus BE as that of an interruption controller:
  the coupling module C2 requests access to the external bus BE by sending a signal to the BREQ terminal of the bus BE received directly by the arbitrating module C1 of the bus BE. When the latter decides to grant access to the bus BE, it activates the daisy chain granting access to the bus BE between the coupling modules of each tray by sending a signal to the BGOUT terminal connected to the bus BE.

When the coupling module C2 receives access grant to the bus BE, it declares it busy by sending a signal on the BUSY line, transfers the interruption number of the address transfer AD lines of local bus BL2 to the address transfer AD lines of the bus BE, sends the IACK signal on the bus BE and puts itself in standby for the interruption vector.

The IACK signal then arrives directly at the arbitrating module C1 via the external bus BE. Depending on whether or not the module requesting the interruption is in tray B1, the coupling and arbitrating module C1 sends the IACK signal, either on the local bus BL1, or on the external bus BE.

When the coupling module in tray B3, which contains the requesting module D, receives the IACKIN signal, it acts as the interruption requestor in relation to the external bus BE and as the controller in relation to local bus BL3:

it requests access to bus BL3 by emitting a signal on one of the four BREQ lines arriving directly at arbitrating module A3. When the arbitrating module A3 decides to grant access to bus BL3, it sends a signal to the corresponding BGOUT terminal.

When the module C3 receives a signal at its BGIN terminal corresponding to the activated BREQ line, it declares bus BL3 busy by emitting a signal on the BUSY line of the same bus, transfers the bus BE interruption number to bus BL3, and sends a signal on the IACK line of bus BL3 to transmit acknowledgement of the interruption.

The IACK signal is then received directly by module A3 which then activates the associated daisy chain on bus BL3.

When the module D requesting the interruption receives the IACK signal corresponding to the interruption it requested, it presents the interruption vector on the data transfer DT lines of bus BL3 which it validates by the DTACK signal, thus enabling the controller C to declare the line free by sending the corresponding signal on the BUSY line.

The coupling module C3 transfers the interruption vector from the local bus BL3 to the external bus BE.

The coupling module C2 then transfers the interruption vector from the external bus BE to the local bus BL2 which it validates by emitting the DTACK signal.

An important advantage of the invention as previously described, consists in that, during acknowledgement by the controller of an interruption activated by a requestor situated in another tray, only the local buses of the two trays in question have been busy. The local operating of the other trays has therefore not been interrupted.

I claim:

1. A device managing the accessing priority to common resources of functional modules divided over a plurality of local units in each of which said functional modules are connected in series to form a local daisy chain having two ends, one of said modules being located at one of said ends and acting as an arbiter, each functional module comprising a switch connected serially to the switches of the previous and/or next modules in said chain, the switch of each of said modules having at least two statuses:

a closed status in which it closes said chain when there is no request from the module, and an open status in which it interrupts said chain when, subsequent to a request, the module is awaiting a reply transmitted by the arbiter module in said chain which receives the requests, one of said modules of each of said local units being a coupler connected in series with the couplers of the other local units to form a daisy chain external to said local units, the coupler of each of said local unit comprising means either to ensure continuity of the external daisy chain when none of the modules in said local unit has made a request for a resource available in another local unit, or in the other case to interrupt said external daisy chain and connect it to said local daisy chain.

2. The device as claimed in claim 1, wherein the functional modules of each of said local units are interconnected by a local line inside the local unit, which is used to transmit the requests from said functional modules of the local unit to said arbiter module. first switch enabling a first input terminal of said coupler connected to said external daisy chain to be connected, either to a first output terminal of said coupler connected to the same daisy chain when none of the modules of said local unit has been requested by a module of another local unit, or in another case to a first request terminal of said coupler connected to a local line interconnecting the modules of said local unit said second switch enabling a second input terminal of said coupler connected to said local daisy chain to be connected, either to a second output terminal of said coupler connected to the same daisy chain when none of the modules of said local unit has made a request for a module of another local unit, or in another case to a second request terminal of said coupler connected to an external line outside said local units interconnecting each of said couplers.

3. The device as claimed in claim 1, wherein the requests from said couplers situated in said local units are transmitted to the coupler of the local unit situated at the head of said external daisy chain by means of a line outside said local units.

4. The device as claimed in claim 1, wherein said coupler comprises two switches, namely, a switch enabling an IN' terminal connected to said external daisy chain to be connected, either to the OUT' terminal connected to the same daisy chain when said functional unit is not the destination, or to an RQ" terminal connected to said local line of said functional unit in the other case, and a switch enabling an IN" terminal connected to said local daisy chain to be connected, either to an OUT" terminal connected to the same daisy chain in order to ensure the continuity of said local daisy chain, or to an RQ' terminal connected to said external line when a module of said functional unit containing said coupling device has submitted a request destined for a module situated in another functional unit.

5. The device as claimed in claim 1, wherein the functional modules of a same local unit are connected in series by several lines parallel to each other so as to form as many as local daisy chains in parallel each coupled to an external daisy chain by means of said coupler, each local and external daisy chain being associated with a respective request line for transmission of requests of as many types as daisy chains respectively from the modules of a local unit to the arbiter module and from the couplers to an arbiter coupler located at one end of the external daisy chain and acting as an arbiter, thereby enabling several types of requests to be processed simultaneously.

* * * * *